United States Patent
Eijsbouts

(10) Patent No.: US 7,951,741 B2
(45) Date of Patent: May 31, 2011

(54) MIXED METAL CATALYST COMPRISING A COMBUSTIBLE BINDER, ITS PROCESS OF PREPARATION AND USE

(75) Inventor: Sonja Eijsbouts, Nieuwkuijk (NL)

(73) Assignee: Albemarle Netherlands, B.V., Amsterdam (NL)

( * ) Notice: Subject to any disclaimer, the term of this patent is extended or adjusted under 35 U.S.C. 154(b) by 970 days.

(21) Appl. No.: 11/271,679

(22) Filed: Nov. 10, 2005

(65) Prior Publication Data

US 2006/0060508 A1 Mar. 23, 2006

Related U.S. Application Data

(62) Division of application No. 09/904,312, filed on Jul. 12, 2001, now Pat. No. 6,989,348.

(60) Provisional application No. 60/277,732, filed on Mar. 21, 2001.

(30) Foreign Application Priority Data

Jul. 12, 2000 (EP) .................................... 00202467

(51) Int. Cl.
*B01J 38/16* (2006.01)

(52) U.S. Cl. ............................. 502/51; 502/38; 502/313
(58) Field of Classification Search .................... 502/38, 502/51, 313

See application file for complete search history.

(56) References Cited

U.S. PATENT DOCUMENTS 5,254,516 A * 10/1993 Gupta et al. .................... 502/84
5,914,288 A * 6/1999 Turk et al. ...................... 502/38

* cited by examiner

*Primary Examiner* — Edward M Johnson
(74) *Attorney, Agent, or Firm* — Jeremy J. Kliebert

(57) ABSTRACT

The present invention pertains to a catalyst composition comprising at least one non-noble Group VIII metal component, at least two Group VIB metal components, and at least about 1 wt. % of a combustible binder material selected from combustible binders and precursors thereof, the Group VIII and Group VIB metal components making up at least about 50 wt. % of the catalyst composition, calculated as oxides. The invention also pertains to a process for preparing the catalyst, to its use in hydroprocessing and to its recycling. The catalyst according to the invention has a higher strength than corresponding binder-free catalysts, and are easier to recycle than catalysts containing a non-combustible binder.

9 Claims, No Drawings

MIXED METAL CATALYST COMPRISING A COMBUSTIBLE BINDER, ITS PROCESS OF PREPARATION AND USE

CROSS REFERENCE TO RELATED APPLICATIONS

This application is a divisional application of U.S. Ser. No. 09/904312, filed Jul. 12, 2001 now U.S. Pat. No. 6,989,348, which claims priority from EP 00202467.7, filed Jul. 12, 2000 and from U.S. provisional application No. 60/277,732, filed on Mar. 21, 2001, the contents of both of which are incorporated herein by reference in their entirety.

FIELD OF THE INVENTION

The invention relates to a process for preparing a catalyst composition, the catalyst composition thus obtained and the use of the composition in hydroprocessing applications.

DESCRIPTION OF RELATED ART

Catalysts comprising at least one Group VIII non-noble metal component and at least two Group VIB metal components, the Group VIII and Group VIB metal components making up at least 50 wt. % of the catalyst composition, calculated as oxides, are known in the art.

U.S. Pat. No. 4,596,785 describes a catalyst composition comprising the disulfides of at least one Group VIII non-noble metal and at least one Group VIB metal. U.S. Pat. No. 4,820,677 describes a catalyst comprising an amorphous sulfide comprising iron as the Group VIII non-noble metal and a metal selected from molybdenum, tungsten or mixtures thereof as the Group VIB metal, as well as a polydentate ligand such as ethylene diamine. In both references the catalyst is prepared via the co-precipitation of water-soluble sources of one Group VIII non-noble metal and two Group VIB metals in the presence of sulfides. The precipitate is isolated, dried, and calcined in an inert atmosphere. The catalysts of these references are binder-free or contain an inorganic oxidic binder, such as alumina.

U.S. Pat. No. 3,678,124 discloses oxidic catalysts to be used in the oxidative dehydrogenation of paraffin hydrocarbons. The catalysts are prepared by coprecipitating water-soluble components of the Group VIB metals and Group VIII non-noble metals. The catalysts are binder-free or contain an oxidic binder such as alumina.

In WO 9903578 catalysts are prepared by co-precipitating specified amounts of a nickel, molybdenum, and tungsten source in the absence of sulfides. The catalyst is binder-free or may contain an oxidic binder such as alumina.

Non-prepublished international patent application PCT/EP00/00354 (corresponds to U.S. patent application Ser. No. 09/482,811, filed Jan. 13, 2000, incorporated herein by reference thereto) describes the preparation of sulfided catalyst compositions by coprecipitation of at least one Group VIII non-noble metal component and at least two Group VIB metal components to form an oxygen-stable precipitate, which is subsequently sulfided. Non-prepublished international patent application PCT/EP00/00355 (corresponds to U.S. patent application Ser. No. 09/231,118, filed Jan. 15, 1999, incorporated herein by reference thereto) describes the preparation of a catalyst composition by contacting at least one Group VIII non-noble metal component and at least two Group VIB metal components in the presence of a protic liquid, wherein at least one of the metal components is at least partly in the solid state during contacting. The catalysts of non-prepublished, international patent applications PCT/EP00/00354 and PCT/EP00/00355 are either binder-free or may contain an oxidic binder such as alumina.

It has appeared that binder-free catalysts containing a Group VIII metal component and at least two Group VIB metal components are often difficult to prepare. More in particular, it is difficult to prepare shaped particles with sufficient strength without the help of a binder.

Catalysts containing, e.g., carbon as carrier are known in the art. They are described in JP laid-open patent application 1986-22071, JP laid-open patent application 1986-101247, JP laid-open patent application 1985-58239 and U.S. Pat. No. 5,576,261.

On the other hand, catalysts containing a binder of a refractory oxide such as alumina or silica encounter problems when the catalyst has to be disposed of or recycled. In that case, the first step is often to separate the metal components from the inorganic binder, e.g., by subsequent leachings with NaOH and $H_2SO_4$. However, such a recycling process is time consuming and expensive. Additionally, it cannot be avoided that a portion of the expensive Group VIB and Group VIII metals remains on the binder and is thus lost.

It is therefore an object of the present invention to provide a catalyst comprising at least one Group VIII non-noble metal component and at least two Group VIB metal components, the Group VIII and Group VIB metal components making up at least about 50 wt. % of the catalyst composition, calculated as oxides, which are both easy to prepare and can easily be recycled after use.

SUMMARY OF THE INVENTION

Accordingly, In a first embodiment, the present invention is directed to a catalyst composition comprising at least one non-noble Group VIII metal component, at least two Group VIB metal components, and at least about 1 wt. % of a combustible binder material selected from combustible binders and precursors thereof, the Group VIII and Group VIB metal components making up at least about 50 wt. % of the catalyst composition, calculated as oxides.

In a second embodiment, the present invention is a process for preparing the above catalyst composition comprising contacting at least one Group VIII non-noble metal component with at least two Group VIB metal components in the presence of a protic liquid, wherein a combustible binder material selected from a combustible binder or a precursor thereof is added prior to, during and/or subsequent to the contacting of the metal components.

In a third embodiment, the present comprises the use of the above catalyst composition for the hydroprocessing of hydrocarbon feedstocks by contacting the feedstocks with the catalyst composition at hydroprocessing reaction conditions.

In a fourth embodiment, the present invention comprises a process for the recycling of a used or waste catalyst composition comprising a Group VIII non-noble metal, a Group VIB metal, and a combustible binder. The catalyst comprises at least about 1 wt % of carbon as part of the combustible binder, based on the total weight of the catalyst composition. The process comprises thermally treating the used or waste catalyst composition in an oxygen-containing atmosphere at a temperature of at least about 300° C.

Other objectives and embodiments of the present invention encompass details about catalyst compositions, reactants and combustible material, all of which are hereinafter disclosed in the following discussion of each of the facets of the present invention.

DETAILED DESCRIPTION OF THE INVENTION

It has been found that the above mentioned objective can be met by employing a combustible binder or a precursor thereof in the catalyst preparation process. This combustible binder not only gives the catalyst sufficient mechanical strength but also can easily be removed from the used catalyst by a thermal treatment. A sophisticated separation of the binder from the Group VIB and Group VIII metals is thus no longer required.

The aforementioned JP laid-open patent application 1986-22071, JP laid open patent application 1986-101247, JP laid-open patent application 1985-58239 and U.S. Pat. No. 5,576,261 teach the use of a carbon binder, but give no hint to a catalyst composition comprising at least one non-noble Group VIII metal component and at least two Group VIB metal components, the Group VIII and Group VIB metal components making up at least about 50 wt.% of the catalyst composition.

CATALYST COMPOSITION OF THE INVENTION

As indicated above, the catalyst composition according to the invention comprises at least one non-noble Group VIII metal component, at least two Group VIB metal components, and at least about 1 wt.% of a combustible binder material selected from combustible binders and precursors thereof, the Group VIII and Group VIB metal components making up at least about 50 wt.% of the catalyst composition, calculated as oxides.

In the context of the present specification, the wording "metal component" refers to a salt, oxide, sulfide, or any intermediate form between oxide and sulfide of the metal in question. As will be evident to the skilled person, the wording "at least two Group VIB metal components" is intended to refer to components of at least two Group VIB metals, e.g., the combination of molybdenum and tungsten.

The indications Group VIB and Group VIII used in the present specification correspond to the Periodic Table of Elements applied by Chemical Abstract Services (CAS system).

Suitable Group VIB metals include chromium, molybdenum, tungsten, or mixtures thereof, with a combination of molybdenum and tungsten being preferred. Suitable Group VIII non-noble metals include iron, cobalt, nickel, or mixtures thereof, preferably cobalt and/or nickel. Preferably, a combination of metal components comprising nickel, molybdenum, and tungsten or nickel, cobalt, molybdenum, and tungsten, or cobalt, molybdenum, and tungsten is employed in the process of the invention.

It is preferred that nickel and/or cobalt make up at least about 50 wt % of the total of Group VIII non-noble metals, more preferably at least about 70 wt %, still more preferably at least about 90 wt %. It may be especially preferred for the Group VIII non-noble metal to consist essentially of nickel and/or cobalt.

It is preferred that molybdenum and tungsten make up at least about 50 wt % of the total of Group VIB metals, more preferably at least about 70 wt %, still more preferably at least about 90 wt %. It may be especially preferred for the Group VIB metal to consist essentially of molybdenum and tungsten.

The molar ratio of Group VIB metals to Group VIII non-noble metals in the catalyst of the invention generally ranges from about 10:1-1:10 and preferably from about 3:1-1:3. The molar ratio of the different Group VIB metals one to the other is at this point in time believed to be not critical. When molybdenum and tungsten are employed as Group VIB metals, the molybenum:tungsten molar ratio preferably lies in the range of about 9:1-1:19, more preferably about 3:1-1:9, most preferably about 3:1-1:6.

The catalyst composition comprises at least about 50 wt. % of the total of Group VIB and Group VIII metal components, calculated as oxides based on the total weight of the catalyst composition, preferably, at least about 70 wt. %, more preferably at least about 90 wt. %, calculated as oxides. The amount of Group VIB metals and Group VIII non-noble metals can be determined via AAS or ICP.

The catalyst composition comprises at least about 1 wt % of a combustible binder material, calculated as carbon on the total weight of the catalyst composition, generally about 1-50 wt %, preferably about 2-30 wt %, and most preferably about 4-10 wt %. The amount combustible binder material, calculated as carbon, is determined as described below under "Characterization Methods."

Preferably, the catalyst composition comprises less than about 10 wt %, more preferably less than about 4 wt %, still more preferably less than about 1 wt % of non-combustible binder. Even more preferably, the catalyst is essentially free from non-combustible binders. A non-combustible binder is defined as a material which is not converted to gaseous components, such as carbon dioxide, in air at a temperature above about 230° C. Examples of non-combustible binders include silica, silica-alumina, alumina, titania, titania-alumina, zirconia, cationic clays or anionic clays such as saponite, bentonite, kaolin, sepiolite or hydrotalcite, and mixtures thereof. That the catalyst composition is essentially free from non-combustible binder means that no such non-combustible binder has been added during the preparation of the catalyst. It does not exclude that such non-combustible binders are present in small amounts as a contamination of the catalyst.

If so desired, the catalyst composition may comprise any further materials such as phosphorus-containing compounds, boron-containing compounds, fluorine containing compounds, additional transition metals, rare earth metals, or mixtures thereof, but this is generally not preferred.

It is preferred for the catalyst composition according to the invention to consist essentially of at least one non-noble Group VIII metal component, at least two Group VIB metal components, and at least about 1 wt % of a combustible binder material. The phrase consists essentially of is intended to exclude substantial amounts of other components. It does not exclude other components being present in small amounts as a contamination of the catalyst.

"A combustible binder material" in the sense of the present invention means one or more combustible binder(s) or precursor(s) thereof. A combustible binder in the sense of the present invention means any binder which is inert under hydroprocessing conditions and which is converted to gaseous compounds, such as carbon dioxide, in air at a temperature above about 230° C. "Inert under hydroprocessing conditions" in the sense of the present invention means that the combustible binder is inert in a hydrogen atmosphere up to a temperature of at least about 200° C. "Inert" in the sense of the present invention means that the combustible binder does not gassify, as can easily be verified by way of, e.g., TGA analysis.

The combustible binder preferably comprises carbon as its major component and optionally further comprises, e.g., O, H, and/or N. The combustible binder preferably comprises at least about 50 wt % of carbon, preferably at least about 70 wt %, more preferably at least about 90 wt %. Typical examples are carbon powder, graphite, activated carbon, pyrocarbon, pyrographite, carbon black, soot and at least partly carbonized organic polymers.

The suitable combustible binder precursor, at least after carbonization as will be discussed below, preferably comprises carbon as its major component and optionally further comprises, e.g., O, H, and/or N. It preferably comprises at least about 50 wt % of carbon, preferably at least about 70 wt %, more preferably at least about 90 wt %, at least after carbonization. Suitable combustible binder precursors include organic polymers, such as polyacrylonitriles, bakelite, polyamides, such as nylon, polyurethanes, cellulose and derivatives thereof, hemicellulosic materials, polyfurfuryl alcohol, styrene-divinylbenzene copolymers, phenol resins, furan resins, polyimide resins, polyphenylene resins, phenolic foams, and polyurethane foams. It is noted that when, a binder precursor is used, generally at least partial carbonization is necessary to render the polymer inert under hydroprocessing conditions. If however, a polymer is employed which in itself is inert under hydroprocessing conditions, such a carbonization step may be omitted.

One may use one or more combustible binders and/or one or more combustible binder precursors.

Preferably, the Group VIB metals and Group VIII non-noble metals are homogeneously distributed within the combustible binder material. As stated above, the presence of the combustible binder leads to an increased mechanical strength of the final catalyst composition. Generally, the catalyst composition of the invention has a mechanical strength, expressed as side crushing strength, of at least about 1 lbs/mm and preferably of at least about 3 lbs/mm (measured on extrudates with a diameter of about 1-2 mm).

Preferably, the catalyst composition in its oxidic state, i.e., prior to any sulfidation step, has a B.E.T. surface area of at least about $10\,m^2/g$, more preferably of at least about $50\,m^2/g$, and most preferably of at least about $80\,m^2/g$, as measured via the B.E.T. method. The median pore diameter (50% of the pore volume is below said diameter, the other 50% above it) of the oxidic catalyst composition preferably is about 3-25 nm, more preferably about 5-15 nm (determined by $N_2$ adsorption). The total pore volume of the oxidic catalyst composition generally is at least about 0.05 ml/g, preferably about 0.05-5 ml/g, more preferably of about 0.1-4 ml/g, still more preferably of about 0.1-3 ml/g, and most preferably of about 0.1-2 ml/g, as determined by nitrogen adsorption. To further increase the mechanical strength, it may be desirable for the oxidic catalyst composition of the invention to have a low macroporosity. Preferably, less than about 30%, more preferably less than about 20% of the pore volume of the catalyst composition is in pores with a diameter larger than about 100 nm (determined by mercury intrusion, contact angle: 130° C).

The catalyst composition may have many different shapes. Suitable shapes include powders, spheres, cylinders, rings, and symmetric or asymmetric polylobes, for instance tri- and quadrulobes. Particles resulting from extrusion, beading or pelleting usually have a diameter in the range of about 0.2 to 10 mm, and their length likewise is in the range of about 0.5 to 20 mm. These particles are generally preferred. Powders resulting from spray-drying generally have a median particle diameter in the range of about 1 μm-100 μm.

In its oxidic state, the catalyst according to the invention has an X-ray diffraction pattern which is essentially amorphous with crystalline peaks at d=2.53 Å and d=1.70 Å.

The present invention also pertains to the catalyst composition according to the invention wherein the metal components have been converted partly or wholly into their sulfides. In that case, it is preferred for the catalyst to be essentially free from Group VIII non-noble metal disulfides. The Group VIII non-noble metals are preferably present as (Group VIII non-noble metal)$_y$S$_x$ with x/y being in the range of about 0.5-1.5, as can be determined by, e.g., XRD. Molybdenum and tungsten, if present, are preferably at least partly present in the sulfided catalyst as disulfides, as can be determined by, e.g., XRD.

Chromium, if present, is preferably at least partly present as sulfide (CrS or $Cr_2S_3$), as can be determined by, e.g., XRD.

Catalyst Preparation Process

The present invention also pertains to a process for preparing a catalyst composition comprising at least one Group VIII non-noble metal component, at least, two Group VIB metal components, and at least about 1 wt. % of a combustible binder material based on the total weight of the catalyst composition, the Group VIII and Group VIB metal components making up at least about 50 wt. % of the catalyst composition, calculated as oxides, which process comprises contacting a Group VIII non-noble metal component and at least two Group VIB metal components in the presence of a protic liquid, wherein a combustible binder material selected from a combustible binder or a precursor thereof is added prior to, during and/or subsequent to the contacting of the metal components.

For details about preparing a catalyst composition comprising at least one Group VIII non-noble metal component, at least two Group VIB metal components, the Group VIII and Group VIB metal components making up at least about 50 wt. % of the catalyst composition, calculated as oxides, reference is made to aforementioned non-prepublished International patent applications PCT/EP00/00354 and PCT/EP00/00355.

It is important to the process according to the invention is that the metal components are reacted in the presence of a protic liquid. Any protic liquid which does not interfere with the reaction may be used. Suitable liquids include water, carboxylic acids, lower alcohols such as ethanol and propanol and mixtures thereof. The use of water is preferred.

The at least three metal components used in the process according to the invention, namely at least one Group VIII metal component and at least two Group VIB metal components may be in the solute state or at least partly in the solid state during the process of the invention. Thus, the reaction may involve three solute components, two solute components and one at least partly solid component, one solute component and two at least partly solid components, and three at least partly solid components. The reaction involves precipitation, and optionally, depending on the state of the various components, also dissolution and re-precipitation.

Generally, there are two possible ways of contacting the metal components with one another, namely by combining and reacting the metal components in solution to form a precipitate (hereinafter designated as the "solution route"), or—by combining and reacting the metal components in the presence of a protic liquid with at least one of the metal components remaining at least partly in the solid state (hereinafter designated as the "solid route"). This latter route may be preferred.

In the solution route, the metal components are completely dissolved when they are combined and/or reacted to form a precipitate. It is possible, e.g., to combine the metal components when they are already in the dissolved state and then have them react to form a precipitate. However, it is also possible to combine one or more of the metal components which are partly or entirely in the solid state with further metal components. However, in this case, care must be taken that the metal components that are partly or entirely in the solid state will dissolve when present in the reaction mixture. In other words, at least once during the solution route process, all metal components must be present wholly as a solution.

Precipitation can be effected by, e.g.,
(a) changing the pH during or after combination of the metal component solutions to such a value that precipitation is induced;
(b) adding a complexing agent during or after combination of the metal component solutions, which complexing agent complexes one or more of the metals to prevent precipitation of the metals, and thereafter changing the reaction conditions, such as temperature or pH, such that the complexing agent releases the metals for precipitation;
(c) adjusting the temperature during or after combination of the metal component solutions to such a value that precipitation is induced;
(d) lowering the amount of solvent during or after combination of the metal component solutions such that precipitation is induced;
(e) adding a non-solvent during or after combination of the metal component solutions to induce precipitation thereof, with a non-solvent meaning that the precipitate is essentially insoluble in this solvent; or
(f) adding an excess of either of the components to such an extent that precipitation is induced.

Adjusting the pH in, e.g., option (a) or (b) can be done by adding a base or an acid to the reaction mixture. However, it is also possible to add compounds which upon the temperature increasing will decompose into hydroxide ions or H+ions, which increase and decrease the pH, respectively. Examples of compounds which will decompose upon the temperature increasing and thereby increase or decrease the pH are urea, nitrites, ammonium cyanate, ammonium hydroxide, and ammonium carbonate.

The solid route comprises combining and reacting the metal components, with at least one of the metal components remaining at least partly in the solid state. More in particular, it comprises adding the metal components to one another and simultaneously and/or thereafter reacting them. Consequently, in the solid route at least one metal component is added at least partly in the solid state and this metal component remains at least partly in the solid state during the entire reaction. The term "at least partly in the solid state" in this context means that at least part of the metal component is present as a solid metal component and, optionally, another part of the metal component is present as a solution in the protic liquid. A typical example of this is a suspension of a metal component in a protic liquid, where the metal is at least partly present as a solid, and optionally partly dissolved in the protic liquid.

It is possible to first prepare a suspension of a metal component in the protic liquid and to add, simultaneously or successively, solution(s) and/or further suspension(s) comprising metal component(s) dissolved and/or suspended in the protic liquid. It is also possible to first combine solutions either simultaneously or successively and to subsequently add further suspension(s) and optionally solution(s) either simultaneously or successively.

As long as at least one metal component is at least partly in the solid state during the solid route, the number of metal components which are at least partly in the solid state is not critical. Thus it is possible for all metal components to be combined in the solid route to be applied at least partly in the solid state. Alternatively, a metal component 10 which is at least partly in solid state can be combined with a metal component which is in the solute state. E.g., one of the metal components is added at least partly in the solid state and, e.g., at least two and preferably two metal components are added in the solute state. In another embodiment, e.g., two metal components are added at least partly in the solid state and at least one and preferably one metal component is added in the solute state.

That a metal component is added "in the solute state" means that the whole amount of this metal component is added as a solution in the protic liquid.

As will be clear from the above, it is possible to add the Group VIII non-noble metal component and the Group VIB metal component in various ways: at various temperatures and pHs, in solution, in suspension, wetted or as such, simultaneously or sequentially. It should be noted that it is preferred not to employ sulfur-containing metal components, as these components and the resulting products are not stable in relation to oxygen, which implies that all process steps subsequent to the addition of this metal component, even those at a lower temperature, will have to be applied under an inert atmosphere.

Suitable water-soluble Group VIII non-noble metal components to be used in the process of the invention include salts, such as nitrates, hydrated nitrates, chlorides, hydrated chlorides, sulfates, hydrated sulfates, formates, acetates, or hypophosphite. Suitable water-soluble nickel (and cobalt components include nitrates, sulfates; acetates, chlorides, formates or mixtures thereof as well as nickel hypophosphite. Suitable water-soluble iron components include iron acetate, chloride, formate, nitrate, sulfate or mixtures thereof.

Suitable water-soluble Group VIB metal components include Group VIB metal salts such as ammonium or alkali metal monomolybdates and tungstates as well as water-soluble isopoly-compounds of molybdenum and tungsten, such as metatungstic acid, or water-soluble heteropoly compounds of molybdenum or tungsten comprising further, e.g., P, Si, Ni, or Co or combinations thereof. Suitable water-soluble isopoly- and heteropoly compounds are given in Molybdenum Chemicals, Chemical data series, Bulletin Cdb-14, February 1969 and in Molybdenum Chemicals, Chemical data series, Bulletin Cdb-12a-revised, November 1969. Suitable water-soluble chromium compounds include chromates, isopolychromates and ammonium chromium sulfate.

If the protic liquid is water, suitable Group VIII non-noble metal components which are at least partly in the solid state during the process of the invention comprise Group VIII non-noble metal components with a low solubility in water such as citrates, oxalates, carbonates, hydroxy-carbonates, hydroxides, phosphates, phosphides, aluminates, molybdates, tungstates, oxides, or mixtures thereof. Oxalates, citrates, carbonates, hydroxy-carbonates, hydroxides, phosphates, molybdates, tungstates, oxides, or mixtures thereof are preferred, with hydroxycarbonates and carbonates being most preferred. Generally, the molar ratio between the hydroxy groups and the carbonate groups in the hydroxy-carbonate lies in the range of about 0-4, preferably about 0-2, more preferably about 0-1 and most preferably about 0.1-0.8.

If the protic liquid is water, suitable Group VIB metal components which are at least partly in the solid state during contacting comprise Group VIB metal components with a low solubility in water, such as di- and trioxides, carbides, nitrides, aluminum salts, acids, or mixtures thereof. Preferred Group VIB metal components which are at least partly in the solid state during contacting are di- and trioxides, acids, and mixtures thereof. Suitable molybdenum components include molybdenum di- and trioxide, molybdenum sulfide, molybdenum carbide, molybdenum nitride, aluminum molybdate, molybdic acids (e.g. $H_2MoO_4$), ammonium phosphomolybdate, or mixtures thereof, with molybdic acid and molybdenum di- and trioxide being preferred. Suitable tungsten components include tungsten di- and trioxide, tungsten sulfide ($WS_2$ and $WS_3$), tungsten carbide, orthotungstic acid ($H_2WO_4*H_2O$), tungsten nitride, aluminum tungstate (also meta- or poly tungstate), ammonium phosphotungstate, or mixtures thereof, with orthotungstic acid and tungsten di- and trioxide being preferred.

If the protic liquid is water, the solubility of the Group VIII non-noble metal components and Group VIB metal components which are at least partly in the solid state during the process of the invention generally is less than about 0.05 mol/(100 ml water at 18° C.).

As indicated above, the combustible binder material is added prior to, during and/or subsequent to the contacting of the metal components. If the combustible binder material is added prior to and/or during the contacting of the metal components, it preferably does not interfere with the reaction of the metal components. Generally, the addition of the combustible binder material subsequent to the contacting, i.e. combining and reacting, of the metal components is preferred.

The combustible binder material can be added prior to the contacting of the metal components by, e.g., adding it to one or more but not all of the metal components or vice versa, and by subsequently adding the not yet added metal components either simultaneously or successively.

The combustible binder material can be added during the contacting of the metal components by, e.g., simultaneously combining the combustible binder material and the metal components or first combining the metal components either simultaneously or successively and then adding the combustible binder material during the reaction of the combined metal components.

The combustible binder material can be added subsequent to the contacting of the metal components by, e.g., adding it directly to the reaction mixture obtained after the reaction of the metal components. However, it is also possible to add the combustible binder material after a solid-liquid separation, a washing step or any of the further process steps which will be discussed in detail below.

Optional further process steps are, e.g., spray-drying, (flash) drying, milling, kneading, slurry-mixing, dry or wet mixing, shaping, calcining and/or sulfiding. Dry mixing means mixing the catalyst composition in the dry state with, e.g., the combustible binder material in the dry state. Wet mixing, e.g., comprises mixing the wet filter cake comprising the catalyst composition and, optionally, e.g., the combustible binder material as liquid, powder or wet filter cake to form a homogenous paste thereof. Shaping comprises, e.g., extrusion, pelletizing, beading and/or spray-drying.

Calcination, if any, is generally performed at a temperature of, e.g., from about 100° C.-600° C., preferably from about 150° C. to 550° C., more preferably about 150° C.-450° C., for a time varying from about 0.5 to 48 hours. The calcination can be carried out, e.g., in an inert atmosphere or in an oxygen-containing atmosphere, such as air. A calcination step may be carried out before the addition of the combustible binder material to the catalyst composition, and/or after such addition. If a calcination step is carried out subsequent to the addition of the combustible binder material, care should be taken that the combustible binder material is not decomposed during said calcination. This can be done by effecting such calcination in the absence of oxygen, or in an oxygen-containing atmosphere at a temperature below about 230° C.

Sulfidation can, e.g., be carried out in the gaseous or the liquid phase. It generally is carried out by contacting the precipitate with a sulfur containing compound such as elementary sulfur, hydrogen sulfide, DMDS, or polysulfides. The sulfidation can generally be carried out in situ and/or ex situ. Preferably, the sulfidation is carried out ex situ, i.e. the sulfidation is carried out in a separate reactor prior to the sulfided catalyst composition being loaded into the hydroprocessing unit. Furthermore, it is preferred that the catalyst composition is sulfided, both ex situ and in situ.

For further details in respect of these further process steps, reference is made to non-prepublished international patent applications PCT/EP00/00354 (heading "Catalyst preparation process" under "Process step (ii)" and "Further optional process steps") and PCT/EP00/00355 (heading "Process of the invention" under "(B) Subsequent process steps").

As mentioned above, "A combustible binder material" in the sense of the present invention means one or more combustible binder(s) or precursor(s) thereof. If the combustible binder material comprises more than one combustible binder or precursor thereof, each binder or binder precursor can be added at any stage prior to, during or subsequent to the contacting of the metal components. One binder or binder precursor may, e.g., be added prior to the contacting of the metal components and another binder or binder precursor may be added subsequent to the contacting of the metal components.

At least if the combustible binder material consists essentially of a combustible binder precursor, the process generally comprises a step in which the combustible binder precursor is converted into the corresponding combustible binder. Such a process step may be, e.g., pyrolysis in an inert atmosphere leading to the at least partial carbonization of the binder precursor. Preferably, the inert atmosphere comprises an inert gas, such as nitrogen. Most preferably, the inert atmosphere is essentially free of oxygen. Such pyrolysis preferably is carried out at a temperature of about 300° C.-600° C. and more preferably about 350° C.-600° C. In principle, also higher temperatures may be applied for the conversion of the combustible binder precursor into the combustible binder. However, in order not to harm the further catalyst constituents, higher temperatures are less preferred. Pyrolysis may be carried out in the presence of steam. As will be evident to the skilled person, the temperature ranges for the pyrolysis will depend on the type of combustible binder precursor employed and can easily be determined by, e.g., thermogravimetric analysis (TGA).

The conversion of the combustible binder precursor into the combustible binder can be carried out at any stage of the process of the invention subsequent to the addition of the combustible binder precursor. If a mixture of a combustible binder and a combustible binder precursor is employed, performing a pyrolysis is still preferred.

If so desired, the combustible binder or combustible binder precursor may be subjected to a reaction with, e.g., phosphorus- or nitrogen-containing compounds in order to introduce functional groups into the combustible binder (precursor).

The combustible binder material can be added, e.g., as a liquid or powder. In this case, the catalyst may, e.g., be prepared as follows: In a first step, the metal components are contacted and reacted via either the so tion along the second balance lid or the solution route. The progress of the reaction may be monitored by XRD, pH change, or any suitable manner used in the art. The catalyst composition is isolated via filtration, after which the filter cake is wet mixed with the combustible binder material. The mixture is shaped, e.g., by extrusion, and the shaped particles are dried and optionally calcined and/or where appropriate subjected to a pyrolysis step. Optionally, the resulting composition is sulfided. The catalyst may also be prepared by the successive steps of adding the combustible binder material prior to or during the contacting of the metal components according to the solid or the solution route, isolating the catalyst composition via filtration, shaping the filter cake, e.g., by extrusion, drying, and optionally calcining, pyrolysing, and/or sulfiding the resulting composition. If the combustible binder material is a combustible binder precursor, the process embodiments will generally comprise a step to convert the combustible binder precursor into the combustible binder, e.g., a pyrolysis.

Alternatively, a shaped combustible binder material can be employed, such as a shaped carbon carrier. In this case, the metal components preferably are contacted in the presence of the shaped combustible binder material. If the metal components are contacted according to the solution route, the Group VIB metals and Group VIII non-noble metals will predominantly be located in the pores of the shaped combustible binder material in the final catalyst composition. Such a shaped combustible binder material preferably has a pore volume of at least about 0.5 ml/g, more preferably of about 0.8-1.5 ml/g, as measured by nitrogen adsorption. A shaped combustible binder material can also be employed in the solid route. In this case, e.g., the metal component which remains at least partly in the solid state may be co-shaped, e.g., co-extruded with the combustible binder material, and the resulting shaped material can be contacted with the metal components which are employed in the solute state.

Use According To The Invention

The catalyst composition according to the invention can be used in virtually all hydroprocessing processes to treat a plurality of feeds under wide-ranging reaction conditions, e.g., at temperatures in the range of about 200° C. to 450° C., hydrogen pressures in the range of about 5 to 300 bar, and space velocities (LHSV) in the range of about 0.05 to 10 h$^{-1}$. The term "hydroprocessing" in this context encompasses all processes in which a hydrocarbon feed is reacted with hydrogen at conditions of elevated temperature and elevated pressure (hydroprocessing reaction conditions), including hydrogenation, hydrodesulfurization, hydrodenitrogenation, hydrodemetallization, hydrodearomatization, hydroisomerization, hydrodewaxing, hydrocracking, and hydrocracking under mild pressure conditions, which is commonly referred to as mild hydrocracking. The catalyst composition of the invention is particularly suitable for hydrotreating hydrocarbon feedstocks. Such hydrotreating processes comprise, e.g., hydrodesulfurization, hydrodenitrogenation, and hydrodearomatization of hydrocarbon feedstocks. Suitable feedstocks are, e.g., middle distillates, kero, naphtha, vacuum gas oils, and heavy gas oils. Conventional process conditions can be applied, such as temperatures in the range of about 250° C.-450° C., pressures in the range of about 5-250 bar, space velocities in the range of about 0.1-10 h$^{-1}$, and H$_2$/oil ratios in the range of about 50-2000 Nl/l.

Recycling Process Of The Invention

As stated above, the binder of the catalyst composition of the present invention can easily be removed from the catalyst composition by a thermal treatment. Consequently, the present invention also pertains to a process for recycling a used or waste catalyst composition comprising at least one Group VIII non-noble metal component, at least two Group VIB metal component, and a combustible binder, which process comprises thermally treating the used or waste catalyst composition in an oxygen-containing atmosphere at a temperature of at least about 300° C. Preferably, the thermal treatment is carried out in air. Preferably, the temperature is chosen above about 400° C., more preferably above about 500° C., even more preferably above about 600° C., and most preferably above about 700° C., but preferably below about 850° C. The resulting Group VIB metal components and Group VIII non-noble metal components may be recovered in any conventional way, such as is described in *Catalysis Today*, 30 (1996) 223 (review of E. Furimsky, *Spent refinery catalysts: environment, safety and utilization*, chapter 4.1.1). It is noted that irrespective of the method chosen, the recovery process is simplified significantly by the absence of a binder.

Characterization Methods (a) Side Crushing Strength (SCS)

First, the length of, e.g., an extrudate particle is measured and then the extrudate particle is subjected to compressive loading (25 lbs in 8.6 sec;) by a movable piston. The force required to crush the particle is measured. The procedure is repeated with at least 40 extrudate particles and the average is calculated as force (lbs) per unit length (mm). This method is applied to shaped particles with a length not exceeding 7 mm.

(b) Pore Volume (N$_2$-Adsorption)

The pore volume determination by way of N2 adsorption was carried out as described in the PhD thesis of J. C. P. Broekhoff (University of Technology Delft 1969).

(c) Stability of the Combustible Binder via Thermogravimetric Analysis (TGA)

Samples were heated in a preselected atmosphere at a heating rate of 10 QC/minute and the mass change of the sample was recorded over time. The preselected atmosphere chosen was the gas composition, in which the stability of the combustible binder is to be tested. Further details about TGA can be found in *Appl. Chem.*, 52-1,2385-2391 (1980).

(d) Carbon Content

To determine its carbon content, the catalyst composition was subjected to heating in an induction oven under an oxygen flow. Any carbon contained in the catalyst composition was thus oxidized to carbon dioxide. The carbon dioxide was analyzed using an infrared cell with a detection system based on CO$_2$ IR characteristics. The resulting signals were compared with the signals of calibrated standards to obtain the amount of carbon dioxide and thus the amount of carbon contained in the catalyst composition.

The present invention is illustrated by the following examples:

EXAMPLE 1

A mixed metal composition was prepared by the solid route from nickel hydroxycarbonate, MoO$_3$, and H$_2$WO$_4$. The resulting precipitate was filtered and a wet filter cake was obtained containing about 20 wt % MoO$_3$, 40 wt % WO$_3$, and 40 wt % NiO (determined after calcination at 300° C. in air).

A combustible binder precursor was prepared from furfuryl alcohol by mixing 200 ml of furfuryl alcohol with 200 ml of water and 1 ml of concentrated sulfuric acid, slowly heating the resulting mixture to 90° C., and keeping it at 90° C. for 10 minutes. A two-phase system was obtained. The organic phase (containing the polyfurfuryl alcohol) was separated from the aqueous phase in a separation funnel, resulting in 55.6 g of organic liquid. 500 g of the wet filter cake of the mixed metal composition on a dry base was mixed with the organic liquid. The mixture was then extruded and dried at 120° C. in air for 2 hours.

To convert the combustible binder precursor into a combustible binder, the resulting composition was heated at 300° C. in flowing nitrogen for 2 hours.

The catalyst composition had a side crushing strength (SCS) of 5.6 lbs*mm$^{-1}$. The carbon content was 4.83 wt %. It could be confirmed by TGA that the catalyst composition is stable under hydrogen atmosphere (50 vol % hydrogen in helium) up to a temperature of 270° C. It could further be confirmed by TGA that the combustible binder can be removed from the catalyst composition by heating in air in a temperature range between 250° C. and 700° C.

EXAMPLE 2

A catalyst composition was prepared as described in Example 1, except that the resulting composition was heated at 420° C. in flowing nitrogen for two hours to convert the combustible binder precursor into a combustible binder. The side crushing strength (SCS) was 5.8 lbs*mm$^{-1}$. The carbon content of this catalyst composition was 4.4 wt %. It could be confirmed by TGA that the catalyst composition is stable under hydrogen atmosphere (50 vol % of hydrogen in helium) up to a temperature of 370° C. It could further be confirmed by TGA that the combustible binder can be removed by heating in air in a temperature range between 350° C. and 700° C.

COMPARATIVE EXAMPLE A

A mixed metal composition was prepared as described in Example 1. The resulting wet filter cake was mixed so that an extrudable mix was obtained. The mixture was then extruded, dried at 120° C., and calcined at 300° C. in air. The side crushing strength (SCS) was 4.6 lbs*mm$^{-1}$. This example shows that the side crushing strength of the resulting catalyst is reduced considerably if a combustible binder is absent.

While the compositions and methods of this invention have been described in terms of preferred embodiments, it will be apparent to those of skill in the art that variations may be applied to the compositions, methods and/or processes and in the steps or in the sequence of steps of the methods described herein without departing from the concept and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the scope and concept of the invention.

What is claimed is:

1. A process for preparing a catalyst composition comprising at least one non-noble Group VIII metal component, at least two Group VIB metal components, and at least about 1 wt % of a combustible binder material selected from combustible binders and precursors thereof, the Group VIII and Group VIB metal components making up at least about 50 wt % of the catalyst composition, calculated as oxides, which process comprises contacting the at least one Group VIII non-noble metal component with the at least two Group VIB metal components in the presence of a protic liquid, wherein the combustible binder is added prior to, during and/or subsequent to the contacting of the metal components.

2. The process of claim 1 wherein contacting of the metal components comprises combining and reacting the metal components in solution to form a precipitate.

3. The process of claim 1 wherein contacting of the metal components comprises combining and reacting the metal components in the presence of a protic liquid, with at least one of the metal components remaining at least partly in the solid state during the entire process.

4. The process of claim 1 wherein the combustible binder material comprises a precursor of a combustible binder and the precursor is converted into a combustible binder after addition.

5. The process of claim 4 wherein the precursor of the combustible binder is converted into the combustible binder by pyrolysis in an inert atmosphere at a temperature in the range of about 300° C.-600° C.

6. The process of claim 1 which includes a sulfidation step.

7. A process for the hydroprocessing of hydrocarbon feedstocks wherein the catalyst composition of claim 1 is contacted with said hydrocarbon feedstocks at hydroprocessing reaction conditions.

8. A process for the recycling of a used or waste catalyst composition comprising a Group VIII non-noble metal, a Group VIB metal, and a combustible binder, wherein the catalyst comprises at least about 1 wt % of carbon as part of the combustible binder, based on the total weight of the catalyst composition, which process comprises thermally treating the used or waste catalyst composition in an oxygen-containing atmosphere at a temperature of at least about 300° C.

9. The process of claim 8 wherein the used or waste catalyst comprises at least one Group VIII non-noble metal component and at least two Group VIB metal components, the Group VIII and Group VIB metal components making up at least about 50 wt. % of the catalyst composition, calculated as oxides.

* * * * *